United States Patent Office 2,995,861
Patented Aug. 15, 1961

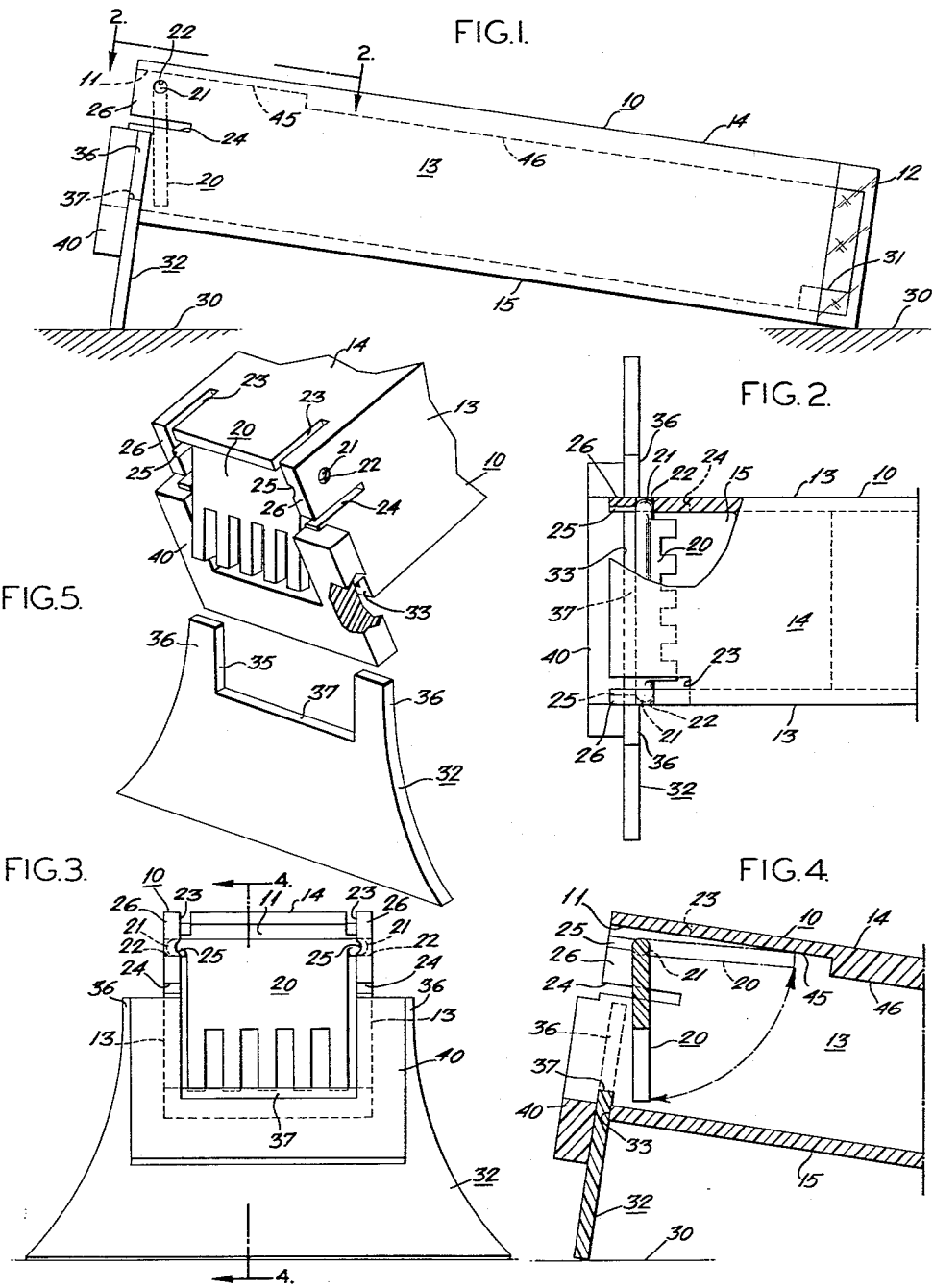

2,995,861
ANIMAL TRAP
George E. Osborn, 4708 Large St., Philadelphia, Pa.
Filed June 30, 1959, Ser. No. 823,867
5 Claims. (Cl. 43—66)

The present invention relates to traps, and has particular application to a trap for rodents which does not injure the animal but merely retains it in an enclosure by means of a one-way gate.

Conventional traps of this type usually comprise a large container having a one-way gate at one location and a second gate which is normally locked at another location for the removal of the trapped animal. Such traps are difficult to empty of the trapped animal, since there is a risk of being bitten by the animal during removal. Further the two openings in the trap and the closures therefor substantially increase the cost of production, and the danger of improper functioning due to failure of one of the closures is greater than where only a single closure is provided.

With the foregoing in mind a primary object of the present invention is to provide a trap of the stated type having a single gate constructed to normally function as a one-way gate but which is operable to permit discharge of the animal through the gate without handling the animal.

The invention also provides a trap having an enclosure of elongated tubular form which restrains the animal against turning within the trap so that its back side confronts the gate at all times, thereby protecting the gate against damage by the animal's chewing.

The present invention provides a trap of simple and economical construction which is fully effective in operation and in use.

All of the objects of the present invention and the various features and details of the construction and operation thereof are more fully set forth hereinafter with reference to the accompanying drawing wherein:

FIG. 1 is a view in side elevation of a trap made in accordance with the present invention;

FIG. 2 is a plan view as seen on the line 2—2 of FIG. 2;

FIG. 3 is an end elevational view as seen from the left in FIG. 1 with a portion broken away to more clearly illustrate the construction;

FIG. 4 is a fragmentary sectional view taken on the line 4—4 of FIG. 3; and

FIG. 5 is a fragmentary view in perspective showing the trap in position for discharging the animal.

Referring to the drawing, the trap of the present invention comprises an elongated tubular body portion 10 having an opening at one end as indicated at 11 and closed at the other end by an end closure 12. Preferably the body portion 10 is molded of a hard plastic and is of generally square cross section. The side walls 13 and top and bottom walls 14 and 15 respectively may be opaque and the end closure 12 is preferably transparent so that when the mouse or other animal looks into the body portion 10 from the open end 11 it receives the impression that the opposite end is unobstructed.

A one-way gate is provided at the open end of the body portion 10. In the present instance the gate comprises a slatted element 20 supported in the side walls 13 by means of a pair of trunnions 21, 21 journalled in apertures 22 in the side walls adjacent the upper edge of the open end 11. The trunnions 21 are formed integrally with the slatted element 20 and to provide for assembly and disassembly of the gate from the body portion 10, slits are provided at 23 in the top wall 14 at its junctions with the side walls, and at 24 in the side walls 13 thereby affording limited flexure of a resilient tab 26 defined between the slits 23 and 24 in the upper portion of the side walls. Grooves 25, 25 are provided on the inner surfaces of the tabs 26 of the side walls 13 to guide the trunnions into the apertures 22.

Preferably in accordance with the invention, the body portion is mounted on the supporting surface 30 at an inclination so that the bottom wall 15 slopes from the opening 11 towards the closed end 12. The bait is positioned at the lower end of the bottom wall which is remote from the open end 11. To provide the elevations, a pedestal is provided at 32. As shown in FIGS. 2, 3 and 5, the pedestal extends laterally beyond the elongated body portion 10 to provide lateral support for the body portion and prevent its tipping.

The pedestal is releasably engaged with the body portion by means of a slot 33 extending across the full width of the bottom wall 15 adjacent the open end 11 and extending upwardly into the side walls 13, 13. The pedestal 32 is provided with a cut-out 35 having a width corresponding to the exterior spacing of the side walls so as to define a pair of upstanding arms 36, 36 which embrace the sides of the body portion 10. The bottom wall 37 projects upwardly a distance to serve as a keeper which retains the gate 20 against outward movement, the lower end of the gate engaging against the keeper 37 upon outward pressure thereon. By reason of the inclination of the body portion, the gate 20 hangs freely out of engagement with the keeper as shown in FIGS. 1 and 4. In order to provide firm support for the pedestal 32, the body portion 10 is provided with an enlarged abutment 40 of generally U-shaped form against which the forward surface of the pedestal 32 bears.

In the present instance, the pedestal 32 is slidably engaged in the slot 33 for removal and replacement. Thus in the operation of the trap, with the trap as assembled in FIG. 1, the mouse or other animal upon sensing the bait 31 at the remote end of the trap, is free to enter the trap by pivoting the gate 20 rearwardly. When the animal has progressed into the trap sufficiently, the gate is free to swing down against the keeper 37 so that after the animal has eaten the bait 31, any attempt to return is barred by engagement of the gate 20 by the keeper 37 preventing outward pivotal movement. Preferably the dimensions of the trap are such as to prevent the animal from turning in the trap so that it cannot gnaw at the gate and possibly manipulate it inwardly to effect an escape.

When it has been determined that the trap has caught an animal, it is picked up to disengage the pedestal 32 from the slot 33 thereby permitting outward pivotal movement of the gate 20. The trap is then inverted with its open end down over a pail of water or other suitable receptacle in order to discharge the animal. If it is desired to insure killing of the animal, the bait 31 may be poisoned. After the animal is discharged from the trap, the pedestal 32 is again engaged in the slot 33 with the bait 20 on the inside and the trap is again ready for use.

By reason of the special construction of the top wall 14, it is not necessary to disengage the body portion 10 from the pedestal 32 when an animal is to be discharged through the opening 11. As shown in the drawings, the top wall 14 has a reduced portion 45 adjacent the open end of the trap which reduced portion is of sufficient depth to receive the gate 20. As shown in FIG. 1, when the gate 20 is at its upper limit position, it is flush with the major portion 46 of the upper wall 14. Thus it is possible to discharge the animal without removing the pedestal 32 since the trap may then be inverted with its upper wall 14 lowermost thereby causing the gate 20 to nest in the reduced portion 45. By reason of the flush positioning of the gate with the major portion 46 of the upper wall 14, the animal is free to slide out of the opening without danger of catching on the gate. It is noted that when the trap is inverted, the animal will be resting on its back and the legs will be uppermost so that they will not catch on the gate.

While a particular embodiment of the present invention has been herein illustrated and described it is not intended to limit the invention to such disclosure but changes and modifications may be made therein and thereto within the scope of the following claims.

I claim:

1. An animal trap comprising a tubular body portion of generally rectangular cross-section having side walls and top and bottom walls, said walls at one end defining an opening for the admission and discharge of the animal, an end closure at the opposite end, a rectangular element conforming generally to the cross-section of said tubular body portions, trunnions projecting outwardly from said rectangular element adjacent its top edge, means defining a resilient tab adjacent the upper edge of each side wall at the opening, means mounting said trunnions in said tabs to pivotally mount said rectangular element to normally close said opening, said bottom wall being slotted adjacent said open end, said slot continuing into the side walls, and a pedestal having a portion adapted to slidably engage in said slot and project into the interior of said body to constitute abutment means projecting into said opening at its lower edge to intercept the path of movement of said rectangular element in an outward direction, said rectangular element being freely pivotal inwardly of the body portion to thereby constitute a one-way gate affording admission of the animal into the body portion but normally precluding discharge of the animal therefrom, said pedestal mounting the open end of said housing above the closed end whereby the bottom wall thereof declines from said open end to said end closure.

2. An animal trap according to claim 1 wherein said abutment means is releasably engaged with said body portion for displacement out of the path of said rectangular element to afford outward pivotal movement of said rectangular element when it is desired to discharge the animal from the trap.

3. Apparatus according to claim 1 wherein said top wall is recessed adjacent said open end to receive the free end of said rectangular element in its inward limit position whereby upon inversion of the trap to a position with its top wall lowermost, said recess receives the free end portion of said gate to prevent interference of the same with the discharge of the animal from the trap.

4. Apparatus according to claim 1 wherein said side walls, top wall and bottom wall are opaque and said end closure is transparent.

5. An animal trap according to claim 1 wherein the rectangular cross-section of said body portion is greater than the girth of the animal, but is insufficient to permit turning of the animal therein.

References Cited in the file of this patent

UNITED STATES PATENTS

| | | |
|---|---|---|
| 1,074,916 | Wiesen | Oct. 7, 1913 |
| 1,077,064 | Hamann | Oct. 28, 1913 |
| 1,326,662 | Kampfe | Dec. 30, 1919 |
| 1,713,167 | Bushman | May 14, 1929 |
| 1,868,847 | Pearson | July 26, 1932 |
| 2,231,191 | Martino | Feb. 11, 1941 |